US007787869B2

(12) United States Patent
Rice et al.

(10) Patent No.: US 7,787,869 B2
(45) Date of Patent: Aug. 31, 2010

(54) DEVICE, METHOD, AND COMPUTER PROGRAM PRODUCT FOR PROVIDING ENHANCED BLOGGING FEATURES ON A MOBILE PHONE

(75) Inventors: Myra L. Rice, Durham, NC (US); John Eric Ang, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 793 days.

(21) Appl. No.: 11/678,660

(22) Filed: Feb. 26, 2007

(65) Prior Publication Data

US 2008/0207232 A1 Aug. 28, 2008

(51) Int. Cl.
*H04M 3/42* (2006.01)
*H04M 3/493* (2006.01)
(52) U.S. Cl. .................................. 455/414.2; 600/586
(58) Field of Classification Search .............. 455/414.2; 600/586
See application file for complete search history.

(56) References Cited

U.S. PATENT DOCUMENTS 7,069,003 B2 * 6/2006 Lehikoinen et al. ...... 455/414.2

2006/0064037 A1 * 3/2006 Shalon et al. ............... 600/586

FOREIGN PATENT DOCUMENTS

KR 20050037302 A 4/2005

* cited by examiner

*Primary Examiner*—William D Cumming
(74) *Attorney, Agent, or Firm*—Harrity & Harrity, LLP

(57) ABSTRACT

A method, device and computer program product for updating a blog web-site use a portable mobile communications device equipped with one or more data generating sensors. This includes acquiring sensor data from the sensors and creating a blog entry containing the acquired sensor data. The blog entry is then sent from the portable mobile communications device to a blog Internet web-site over a mobile network. A blog update profile indicates a schedule for updates and which sensor data to include. Sensor blog data can also be appended to manual blog entry data to form a single blog entry. The sensors can be integrated within the portable mobile communications device, or can be accessories that are communicable with the portable mobile communications device. The sensors can include a location determination sensor, an accelerometer, a heart rate monitor, a blood pressure monitor, or a body temperature monitor.

24 Claims, 4 Drawing Sheets

DEVICE, METHOD, AND COMPUTER PROGRAM PRODUCT FOR PROVIDING ENHANCED BLOGGING FEATURES ON A MOBILE PHONE

BACKGROUND OF THE INVENTION

Portable mobile communications devices such as mobile phones are becoming ever more sophisticated and include many new features and capabilities. Many portable mobile communications devices include the ability to access the Internet. With Internet access, a variety of additional possibilities are available to the user including 'blogging'. A portable mobile communications device user may have a social network of friends with whom they may wish to share information about themselves. Internet blogging allows for just this sort of free expression. A blog, a concatenation of the phrase "web log" is essentially a means for a user to upload data to a specified blog web-site so that the data can be accessed by other Internet users. Typically, the blog data is text like that of a personal journal. While the blog site is hosted somewhere within the Internet, it is accessible to portable mobile communications devices via a mobile network that is communicable with the Internet. Current blogging could be greatly enhanced beyond manual text entry to incorporate automated or triggered entries based on predefined stimulus and sensor data.

BRIEF SUMMARY OF EMBODIMENTS OF THE INVENTION

In one embodiment, there is described a method of updating a blog web-site using a portable mobile communications device equipped with one or more data generating sensors. The method includes acquiring sensor data from the data generating sensors and creating a blog entry containing the acquired sensor data. The blog entry is then sent or posted from the portable mobile communications device to a blog Internet web-site over a mobile network having Internet access.

A blog update profile contains parameters that indicate a schedule for automatic blog updates and which sensor data to include in a blog update. A sensor data blog update can also be appended to manual blog entry data to form a single blog entry.

The data generating sensors can be integrated within the portable mobile communications device, or can be accessories that are communicable (wired or wirelessly) with the portable mobile communications device. The sensors can include, but are not limited to, a location determination sensor (e.g., GPS), an accelerometer, and biometric sensors such as, for instance, a heart rate monitor, a blood pressure monitor, or a body temperature monitor.

In another embodiment, the method described above is implemented as a computer program product embodied on a computer readable medium.

In yet another embodiment, there is described a portable mobile communications device for updating a blog web-site. The portable mobile communications device includes one or more data generating sensors, an RF module for communicating data with a mobile network (and the Internet), a user interface including a display for displaying text and graphics and a keypad for manually entering blog data and responding to prompts for blog input, an enhanced blogging application for creating blog entries that include sensor data and posting the created blog entries to an Internet blog web-site via the RF module, and a processor for executing the enhanced blogging application.

The data generating sensors can be integrated within the portable mobile communications device, or can be accessories that are communicable (wired or wirelessly) with the portable mobile communications device. The sensors can include, but are not limited to, a location determination sensor (e.g., GPS), an accelerometer, and biometric sensors such as, for instance, a heart rate monitor, a blood pressure monitor, or a body temperature monitor.

In still another embodiment, there is described a method of updating a blog web-site from a portable mobile communications device, the blog update including workout data acquired from sensors coupled with the portable mobile communications device and including at least one of a heart rate monitor, an accelerometer, a body temperature sensor and a location determination sensor. The method includes creating a workout profile defining the parameters of a workout, acquiring workout sensor data from the sensors, creating a blog entry containing the acquired workout sensor data, and transmitting the blog entry from the portable mobile communications device to a blog web-site over a mobile network having Internet access.

The step of creating a workout profile defining the parameters of a workout includes defining one or more of the length of the workout in terms of time, a time interval between sensor updates, the length of the workout in terms of distance, a peak heart rate to measure against during the workout, and whether to blog each update.

The method further includes displaying the current sensor workout data on the display of the portable mobile communications device, comparing current sensor data to the data in the workout profile at each defined time interval, creating a blog entry of the interval sensor workout data, and calculating and displaying the time remaining in workout value and/or distance remaining in the workout.

DETAILED DESCRIPTION OF EMBODIMENTS OF THE INVENTION

Figure 1:
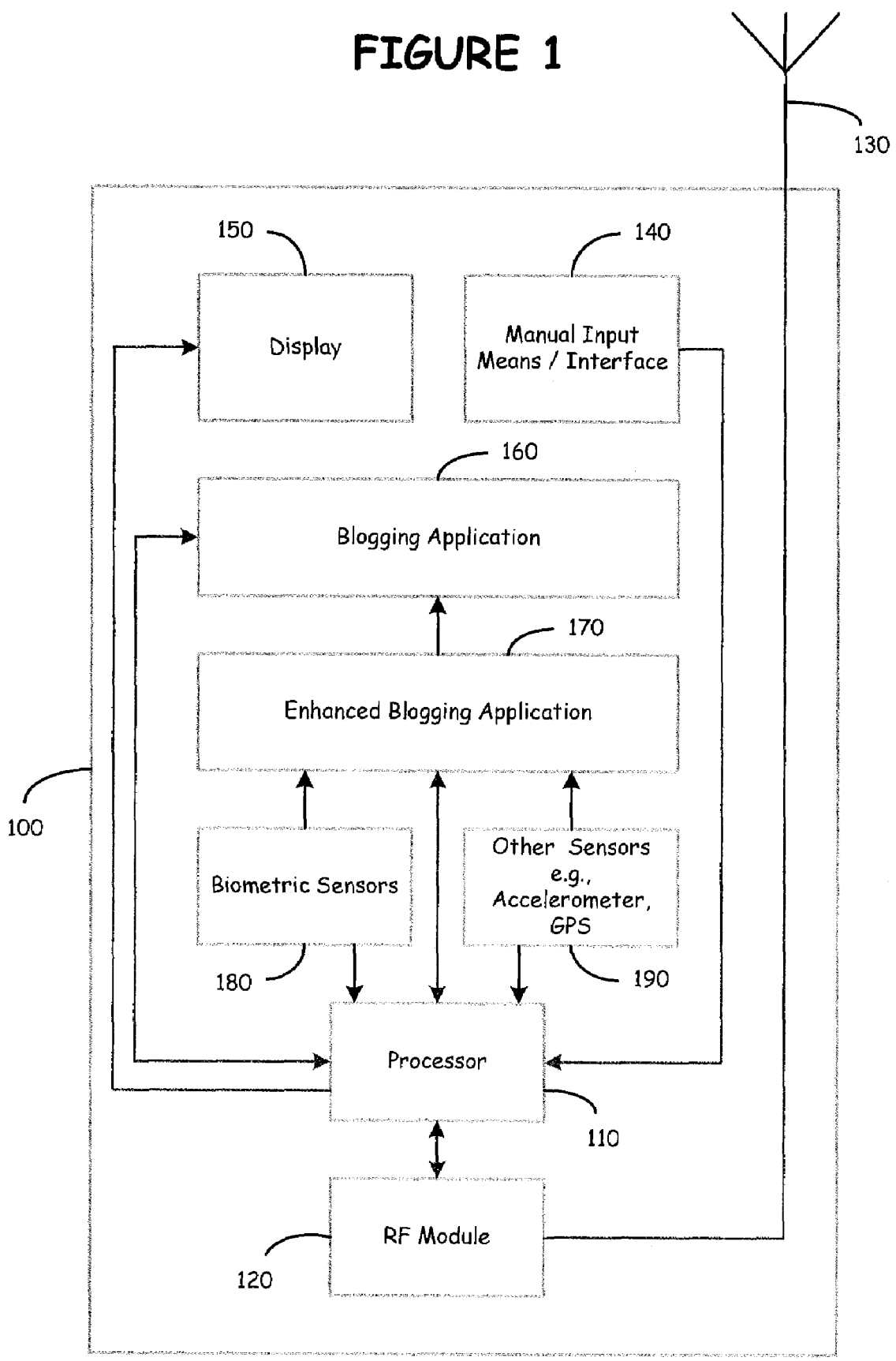
FIG. 1 is an illustration of a portable mobile communications device and some of its components for implementing and executing an enhanced blogging application.

FIG. 1 is an illustration of a portable mobile communications device 100 and some of its components for implementing and executing an enhanced blogging application 170. At the core of the portable mobile communications device 100 is a processor 110. The processor 110 is responsible for executing a myriad of applications resident in the portable mobile communications device 100. In fact, it is not uncommon to employ more than one processor 110 in a portable mobile communications device 100 and while the illustration in FIG. 1 indicates only a single processor 110 that is for ease of illustration only.

The processor 110 is coupled with an RF module 120, a display 150, a user interface 140, a set of biometric sensors 180, other data sensors 190, a blogging application 160, and an enhanced blogging application 170. The RF module 120 is also coupled with an antenna 130 to facilitate RF communications with a mobile network and, in turn, the Internet since the mobile network is communicable with the Internet.

The processor 110 executes the software applications hosted on the portable mobile communications device 100 and relays data and signals among the various other components of the portable mobile communications device 100. The display 150 provides the means for displaying text and graphics to the user. The display 150 is also used in conjunction with the user interface 140 to allow a user to input data to the various applications hosted by the portable mobile communications device 1 00.

Elements of the user interface 140, while not specifically shown, can include a keypad, additional special purpose hardwired keys that may or may not be programmable, soft key functions using the display 150, a microphone for any potential voice recognition input. In some instances, the display 150 may also incorporate touchscreen technology that allows the user to use the display itself as a re-configurable keypad depending on the application currently being executed.

A variety of biometric sensors 180 can be incorporated into the portable mobile communications device 100 or attached to the portable mobile communications device 100 as accessories in either a wired or wireless fashion. The biometric sensors 180 can include, for instance, a heart rate monitor, a body temperature monitor, or a blood pressure monitor. Other sensors may also be included within the portable mobile communications device 100 as accessories in either a wired or wireless fashion. These other sensors may include an accelerometer to measure motion or a global positioning system (GPS) monitor (or other location determination device) to pinpoint geographic location of the portable mobile communications device 100.

The blogging application 160 and enhanced blogging application 170 are hosted by the portable mobile communications device 100 and executed by the processor 110. They have been illustrated separately in FIG. 1 but the enhanced blogging application 170 could readily be directly incorporated into the blogging application 160 as an upgrade or the like. The blogging applications 160, 170 allow the user to upload or 'post' data that has been manually and, in some instances, automatically generated to a pre-determined blog web-site on the Internet. Other Internet users and other portable mobile communications device 100 users that have access to the Internet can then download the posted blog data for personal enjoyment.

Figure 2:
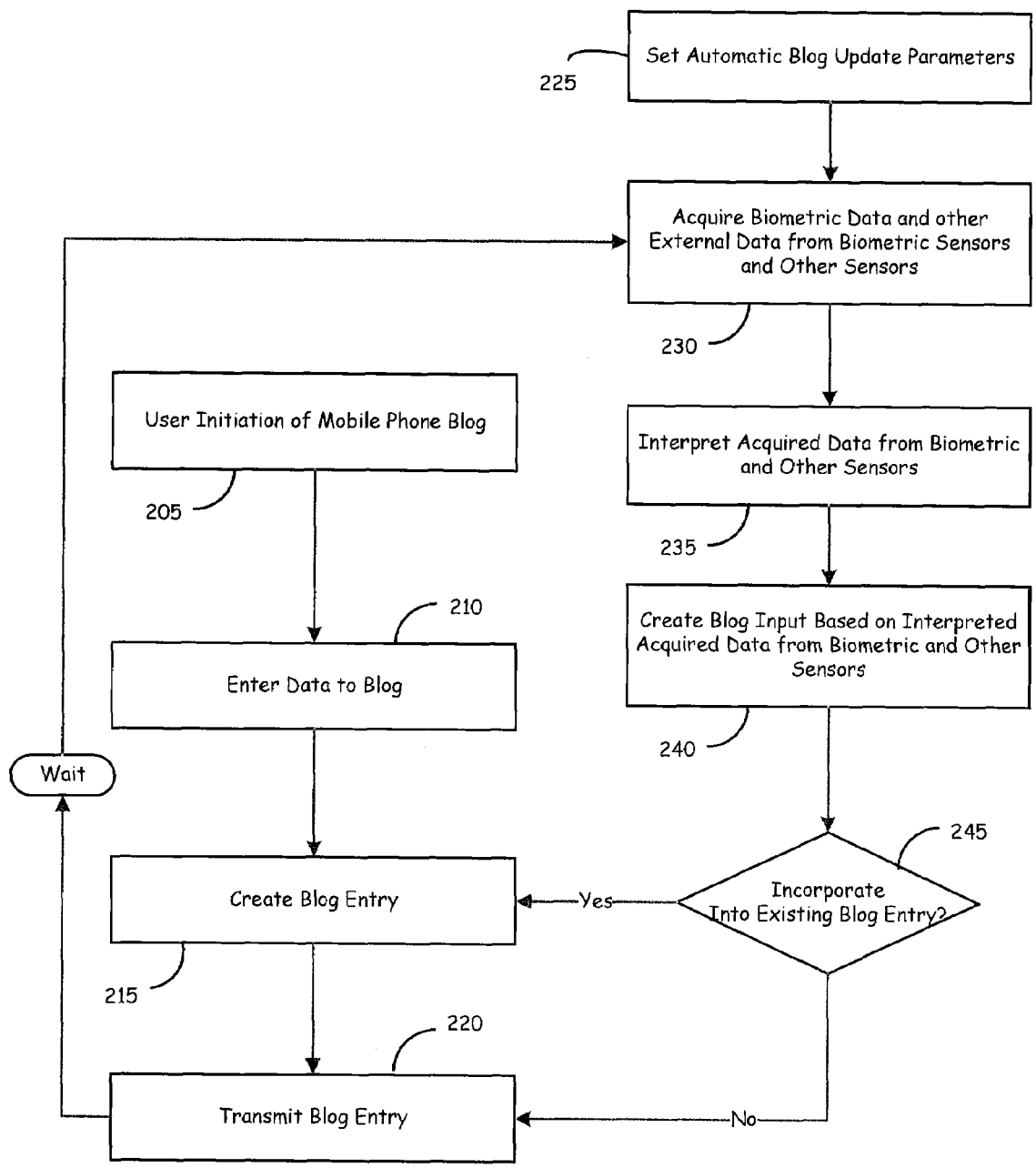
FIG. 2 is a logic diagram illustrating one embodiment of the flow of data and steps involved in utilizing an enhanced blogging application within a portable mobile communications device.

FIG. 2 is a logic diagram illustrating one embodiment of the flow of data and steps involved in utilizing an enhanced blogging application within a portable mobile communications device. The blogging process on a portable mobile communications device begins when the user selects and launches the blogging application via the user interface 205.

If the user has never blogged before, the blogging application will prompt the user to set up a web-site blog presence. This will typically involve identifying an Internet address via a universal resource locator (URL) tag to which data will be posted. The set up procedure may also involve setting up security measures such as a user ID and password. The user, the provider, or some combination of both can set blogging parameters for general information like the amount of data that can be posted and how long a post can last before it is deleted or archived.

In one instance, the user's mobile service provider may offer mobile blogging as a feature for subscribers. The mobile service provider can maintain web-site blog locations for its subscribers. The service provider can then issue each subscriber a URL such as, for instance, 9195551234@blog.mobileserviceprovider.com. Each location would be unique based on the subscriber's mobile phone number.

Once the user's blog site has been set up, the user can input blog entries 210 to be posted to the blog web-site. Data can be manually entered via one or more of the user interface mechanisms. Upon completion of entering data the blog entry is formatted and created 215 according to the specifications and/or requirements of the blog web-site. Once created, the blog entry is transmitted 220 from the portable mobile communications device via the RF module to the mobile network where it is routed to the Internet and its final destination web-site blog location. Once posted, the blog entry is now visible (downloadable) to all with Internet access.

The enhanced blogging features allow for additional data to be posted to a blog web-site. This additional data is derived from one or more sensors including biometric sensors that monitor heart rate, temperature, blood pressure, and physical sensors like accelerometers that monitor motion, or positional sensors that monitor current geographic location. All of these sensors observe their environment to sense events and convert sensed events into raw data. The raw data is then made available to a variety of applications including the enhanced blogging application.

The user can exploit the enhanced blogging application by setting up a blogging update profile 225 that includes, among other things, the time period between automatic blog updates, what sensor data will or will not be included in a blog update, the format of the blog entry, etc. For instance, a user may choose to automatically update her blog every 2 hours with geographic data showing her current location. Every other time (e.g., every 4 hours) the user can include heart rate data to give a crude indication of physical activity.

Based on the profile parameters the enhanced blogging application will retrieve the appropriate sensor raw data 230. The raw data is then interpreted and formatted according to the profile 235. The formatted data is then used to automatically create a blog entry 240. At this point the user is prompted whether to include the sensor data blog entry with a standard blog entry. If the user does not respond to the query, it will be considered a 'no' response after a timeout period and the sensor data blog entry will be automatically transmitted (posted) to the blog web-site 220. Otherwise, the user is prompted to manually input additional data to be included with the current blog entry 210. The blog entry is then created 215 and posted 220 as previously described.

Figure 3:
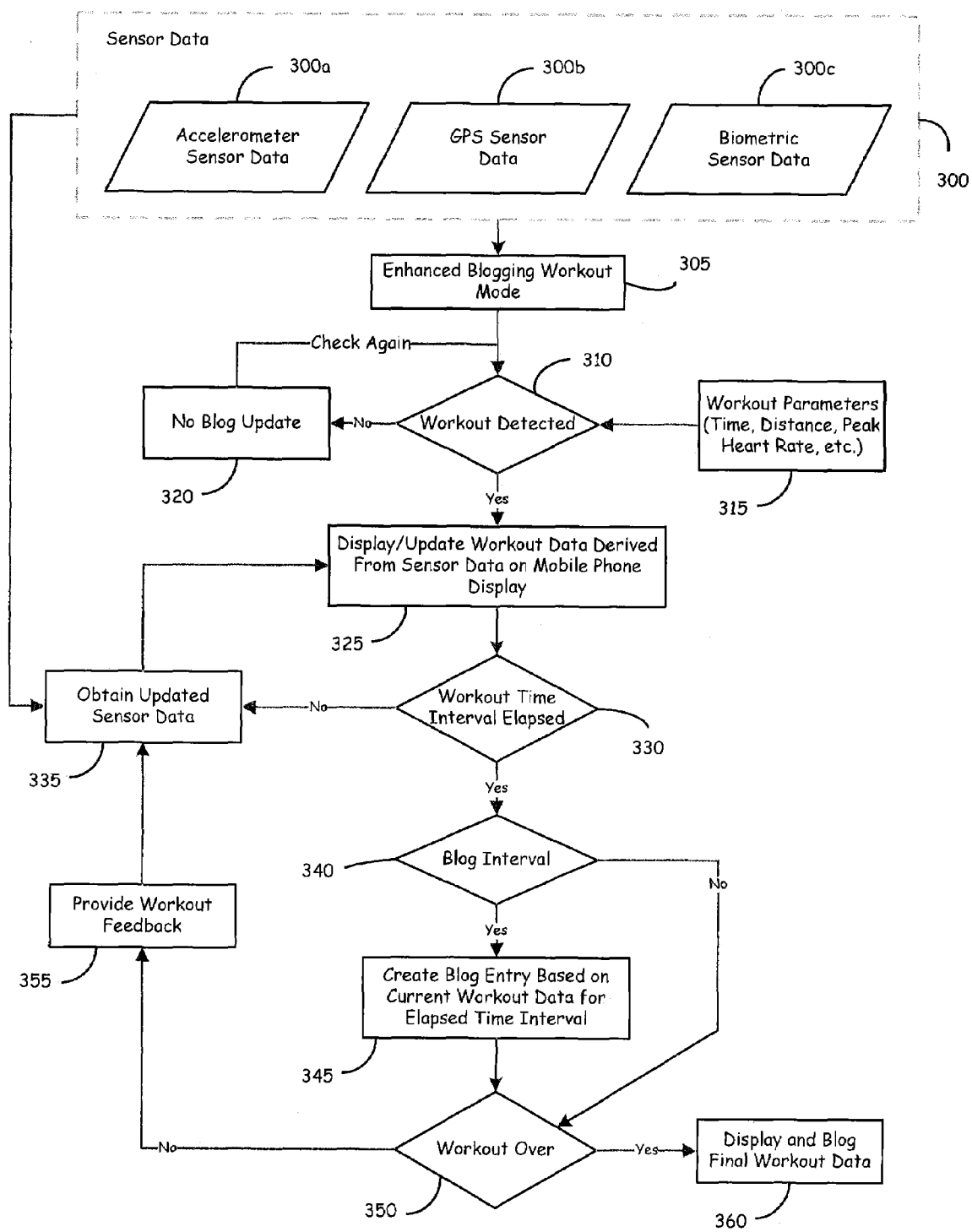
FIG. 3 is a logic diagram illustrating another embodiment of the flow of data and steps involved in utilizing an enhanced blogging application within a portable mobile communications device.

FIG. 3 is a logic diagram illustrating another embodiment of the flow of data and steps involved in utilizing an enhanced blogging application within a portable mobile communications device. This embodiment allows a user to blog workout data. Sensor data 300 is acquired by the various sensors including, but not limited to, an accelerometer 300$a$ to track motion, a GPS sensor 300$b$ to track location, and biometric sensor data 300$c$ (e.g., heart rate, temperature, blood pressure) to monitor body functions. All of the sensor data 300 is forwarded to an enhanced blogging application—workout mode 305. The sensor data is first used as input for a 'workout detected' decision block 310 that determines if the sensor data indicates a workout is about to start.

The enhanced blogging application—workout mode 305 also receives or is pre-programmed with specific workout parameters 315. The specific workout parameters 315 can include a distance to be covered if the workout is jogging, an elapsed time if the workout is to be time constrained, a peak heart rate indicator if the workout is to cease upon reaching a target heart rate. There are other individual parameters that may be part of the group of workout parameters as well. The specific workout parameters 315 may be used individually or in combination to alert the user or trigger a blog entry update.

If no workout is detected 310 then no blog update will occur 320 and control will return to the decision block 310 until a workout is detected in this mode. Once a workout is detected 310, the portable mobile communications device will display/update workout data 325 derived from the sensor data according to a workout profile based on the workout parameters. This could mean, for instance, displaying the user's heart rate, distance traveled, and body temperature at various intervals during the workout. The process will then determine if the workout time has elapsed 330 indicating that the workout is over. If the workout has not yet completed, the next step is to obtain updated sensor data 335 from the various sensors 300. Control is then returned to block 325 so that the updated sensor data can be displayed on the portable mobile communications device. This continues until it is determined that the workout time has elapsed 330. At this point, another decision block determines whether to blog the interval data 340. If the decision is affirmative, then a blog entry is created 345 using the workout data obtained from the sensors during the workout. Typically, this decision will be made ahead of time as part of the enhanced blogging application—workout mode profile so as to not prompt the user repeatedly during a workout. Once the blog entry is created, it is determined if the workout is over 350. If not, then workout feedback can be provided 355 via the portable mobile communications device display. The workout feedback could indicate, for instance, the time remaining in the workout, the distance remaining in the workout, etc. Since the workout is not complete, the next step is to obtain updated sensor data 335 and continue repeating the process until the workout is complete. Upon completion of the workout as determined in decision block 350, the final workout data is displayed and posted to the user's blog web-site 360.

The exact data to blog can be pre-determined in a workout profile. For instance, the user may wish only to blog the peak data such as total distance traveled, total time needed, peak heart rate, and peak body temperature. Or, the user may decide to include interval data as well to show the trajectory of various parameters such as the heart rate building to a peak and perhaps coming back down. The heart rate could be plotted against distance and time to show how the body reacted as the workout progressed.

Figure 4:
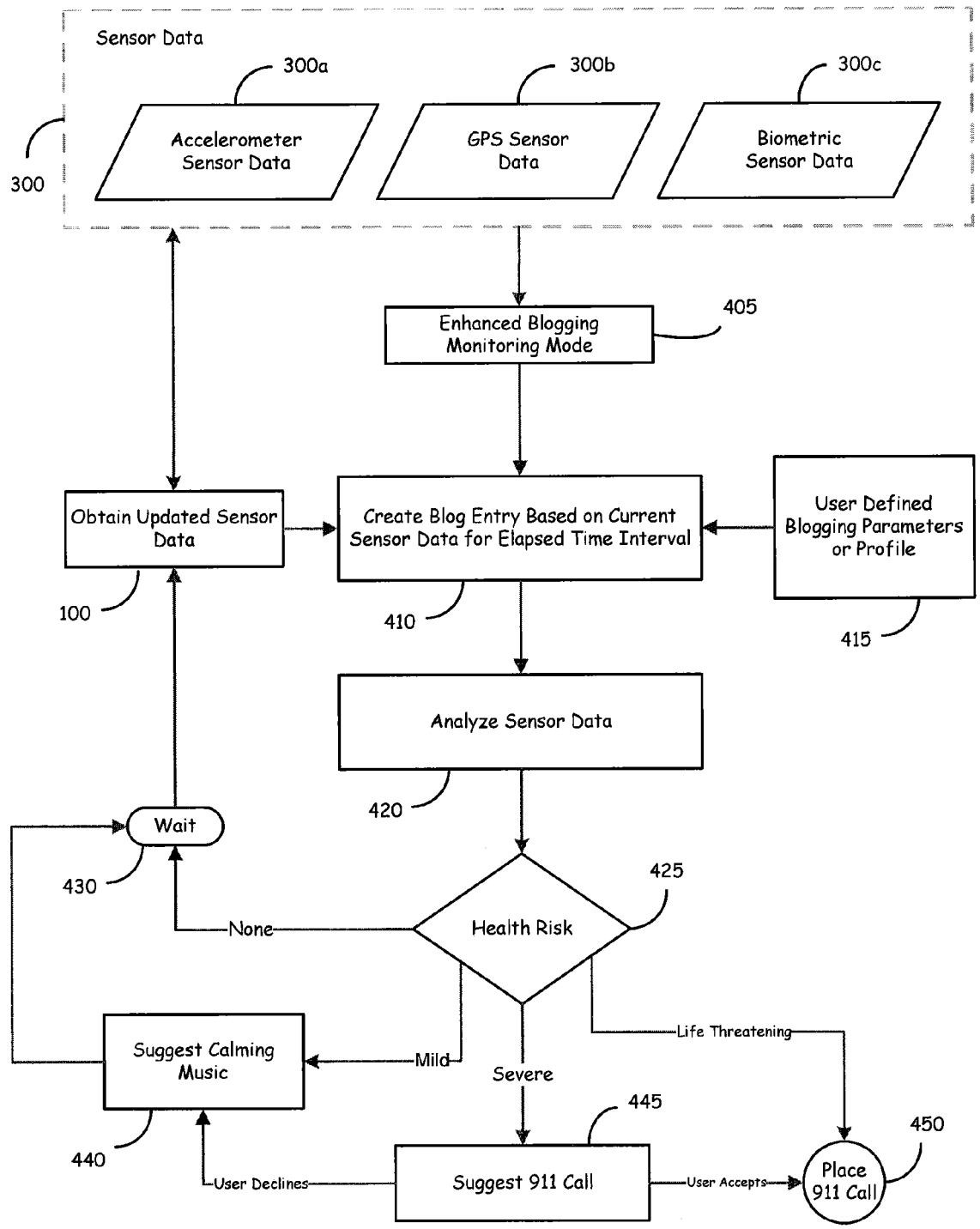
FIG. 4 is a logic diagram illustrating yet another embodiment of the flow of data and steps involved in utilizing an enhanced blogging application within a portable mobile communications device.

FIG. 4 is a logic diagram illustrating yet another embodiment of the flow of data and steps involved in utilizing an enhanced blogging application within a portable mobile communications device. In this embodiment, the user can set up automatic blog updates via a profile that incorporate sensor data. Blogged sensor data can give blog readers a sense of the blogger's mood, location, and overall well-being.

Sensor data 300 is acquired by the various sensors including, but not limited to, an accelerometer 300a to track motion, a GPS sensor 300b to track location, and biometric sensor data 300c (e.g., heart rate, temperature, blood pressure) to monitor body functions. All of the sensor data 300 is forwarded to an enhanced blogging application—monitoring mode 405. A blog entry is created 410 based on the current sensor data for the elapsed time interval. The blog entry is created with the assistance of user defined blogging parameters or an automatic blogging profile 415 that has been pre-programmed. The blogging parameters/profile includes such things as, for instance, an interval between automatic blog updates and the specific items (e.g., which sensor data) to be included in the blog entry. The enhanced blogging application—monitoring mode further analyzes the most recent sensor data 420 to make a determination whether the current sensor data indicates a health risk 425.

Health risks can be classified or characterized, for instance, as none, mild, or severe each prompting a different course of action. Determining whether a health risk is present involves comparing the current sensor values to an expected range of values. For instance, a user's normal heart rate could range between 50 and 80 beats per minute. A heart rate slightly above or below may indicate stress or anxiety while a heart rate significantly above or below the normal range may indicate a more severe health risk that requires immediate attention.

If no health risk is detected, then the application waits 430 until the next interval is due then obtains updated sensor data 435 from the sensors 300. The updated sensor data is used to create the next blog entry 410 before being analyzed 420 and assessed for health risk 425.

If a mild health risk is detected, the application may, via an audible alert and a message on the portable mobile communications device display, suggest some calming music or some other means of relaxation 440. Control is then sent to the wait state 430 and repeats as described above.

If a potentially more severe health risk is detected, the user can be prompted whether a call to 911 emergency services is warranted 445. If the user accepts, a call is automatically placed to 911 450. If the user declines, control is sent to the path indicated by a mild health risk. If the sensor data is so anomalous as to indicate a life threatening situation, the 911 call can be made automatically without prompting the user. This may be beneficial if the user becomes disoriented and/or loses consciousness. While the user may not be able to speak with a 911 operator, location based services may allow emergency personnel to come to the aid of the user.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the portable mobile communications device or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of updating a blog web-site using a portable mobile communications device equipped with one or more data generating sensors, the method comprising:

acquiring sensor data from the one or more data generating sensors, where the one or more data generating sensors detect that a user is starting to exercise, and where the one or more data generating sensors generate biometric sensor data and comprise a biometric sensor that includes at least one of a heart rate monitor, a blood pressure monitor or a body temperature monitor;

creating a blog entry based on the acquired sensor data from the one or more data generating sensors;

transmitting the blog entry from the portable mobile communications device to a blog Internet web-site over a mobile network having Internet access;

creating a blog update profile containing parameters that indicate a schedule for automatic blog updates and that indicate which sensor data to include in a blog update;

determining that the blog entry indicates a health risk to the user;

prompting the user, in response to determining that the blog entry indicates the health risk to the user, to contact emergency services; and acquiring, according to the blog update profile, updated sensor data from the one or more data generating sensors to update the blog entry.

2. The method of claim 1, where the one or more data generating sensors are integrated into the portable mobile communications device.

3. The method of claim 1, where the one or more data generating sensors are further to communicate with the portable mobile communications device.

4. The method of claim 3, where the one or more data generating sensors are further to communicate wirelessly with the portable mobile communications device.

5. The method of claim 4, where the one or more data generating sensors are further to communicate wirelessly with the portable mobile communications device using a radio frequency (RF) protocol.

6. The method of claim 4, where the one or more data generating sensors are further to communicate wirelessly with the portable mobile communications device using infrared (1R).

7. The method of claim 3, where the one or more data generating sensors are further to communicate directly, via a cable, with the portable mobile communications device.

8. The method of claim 1, where the one or more data generating sensors include a location determination sensor.

9. The method of claim 8, where the location determination sensor is a global positioning system (GPS) sensor.

10. The method of claim 1, where the one or more data generating sensors include an accelerometer.

11. A portable mobile communications device for updating a blog web-site comprising:
- one or more data generating sensors, comprising a biometric sensor that includes a heart rate monitor, a blood pressure monitor, and a body temperature monitor;
- a radio frequency (RF) module to communicate data, via a mobile network, with an Internet; and
- a processor to:
    - acquire sensor data from the one or more data generating sensors, where the one or more data generating sensors detect that a user is starting to exercise, and where the one or more data generating sensors generate biometric sensor data,
    - create, in response to the one or more data generating sensors detecting that user is starting to exercise, a blog entry based on the sensor data collected by the one or more data generating sensors,
    - transmit, via the RF module over the mobile network, the blog entry from the portable mobile communications device to an Internet blog website,
    - create a blog update profile containing parameters that indicate a schedule for automatic blog updates and that indicate which sensor data to include in a blog update,
    - determine that the blog entry indicates a health risk to the user,
    - prompt the user, in response to determining that the blog entry indicates the health risk to the user, to contact emergency services, and
    - acquire, according to the blog update profile, updated sensor data from the one or more data generating sensors to update the blog entry.

12. The portable mobile communications device of claim 11, where the one or more data generating sensors are integrated into the portable mobile communications device.

13. The portable mobile communications device of claim 11, where the one or more data generating sensors are further to communicate with the portable mobile communications device.

14. The portable mobile communications device of claim 13, where the one or more data generating sensors are further to communicate wirelessly with the portable mobile communications device.

15. The portable mobile communications device of claim 14, where the one or more data generating sensors are further to communicate wirelessly with the portable mobile communications device using a radio frequency (RF) protocol.

16. The portable mobile communications device of claim 14, where the one or more data generating sensors are further to communicate wirelessly with the portable mobile communications device using infrared (1R).

17. The portable mobile communications device of claim 13, where the one or more data generating sensors are further to communicate directly via a cable with the portable mobile communications device.

18. The portable mobile communications device of claim 11, where the one or more data generating sensors further include a location determination sensor.

19. The portable mobile communications device of claim 18, where the location determination sensor is a global positioning system (GPS) sensor.

20. The portable mobile communications device of claim 11, where the one or more data generating sensors further include an accelerometer.

21. The method of claim 1, where the method further comprises:
- determining that the blog entry indicates that the health risk is life threatening; and
- automatically contacting the emergency services, including bypassing prompting of the user, in response to determining that the blog entry indicates that the health risk is life threatening.

22. The method of claim 21,
where the one or more data generating sensors include a location determination sensor to determine a location of the portable mobile communications device, and
where the method further includes forwarding the location of the portable mobile communications device to the emergency services when the emergency services are contacted.

23. The portable mobile communications device of claim 11, where the processor is further to:
- determine that the blog entry indicates that the health risk is life threatening; and
- automatically contact, via the RF module, the emergency services, including bypassing prompting of the user, in response to determining that the blog entry indicates that the health risk is life threatening.

24. The portable mobile communications device of claim 23, further comprising a user interface including a keypad to manually enter blog data,
where the processor, when creating the blog entry based on the sensor data, is further to append the sensor data to the manually entered blog entry data.

\* \* \* \* \*